United States Patent
Bevan et al.

(10) Patent No.: US 9,118,719 B2
(45) Date of Patent: *Aug. 25, 2015

(54) METHOD, APPARATUS, SIGNALS, AND MEDIUM FOR MANAGING TRANSFER OF DATA IN A DATA NETWORK

(75) Inventors: Stephen John Bevan, Vancouver (CA); Michael Xie, Palo Alto, CA (US); Hongwei Li, Burnaby (CA); Wenping Luo, Burnaby (CA); Shaohong Wei, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/250,364

(22) Filed: Sep. 30, 2011

(65) Prior Publication Data

US 2012/0023228 A1     Jan. 26, 2012

Related U.S. Application Data (62) Division of application No. 11/220,762, filed on Sep. 6, 2005, now Pat. No. 8,166,547.

(51) Int. Cl.
| | | |
|---|---|---|
| *H04L 29/06* | (2006.01) | |
| *H04L 12/24* | (2006.01) | |
| *H04L 12/801* | (2013.01) | |
| *H04L 12/813* | (2013.01) | |
| *H04L 29/08* | (2006.01) | |

(52) U.S. Cl.
CPC ............ *H04L 63/20* (2013.01); *H04L 41/0893* (2013.01); *H04L 47/10* (2013.01); *H04L 47/20* (2013.01); *H04L 63/1425* (2013.01); *H04L 67/10* (2013.01)

(58) Field of Classification Search
CPC ..... H04L 41/0893; H04L 47/10; H04L 67/10; H04L 63/1425; H04L 63/20; H04L 47/20
USPC ........................................................ 726/11–13
See application file for complete search history.

(56) References Cited

U.S. PATENT DOCUMENTS

| | | | |
|---|---|---|---|
| 5,623,600 | A | 4/1997 | Ji |
| 6,058,480 | A | 5/2000 | Brown |
| 6,061,798 | A | 5/2000 | Coley et al. |
| 6,138,110 | A | 10/2000 | Jahn et al. |
| 6,178,244 | B1 | 1/2001 | Takeda et al. |
| 6,473,423 | B1 | 10/2002 | Tebeka et al. |
| 6,553,108 | B1 * | 4/2003 | Felger .................... 379/144.01 |
| 6,556,544 | B1 * | 4/2003 | Lee ............................... 370/256 |
| 6,594,686 | B1 | 7/2003 | Edwards et al. |

(Continued)

OTHER PUBLICATIONS

"U.S. Appl. No. 13/250,285, Non Final Office Action mailed Jun. 5, 2012", 15 pgs.

(Continued)

*Primary Examiner* — Mohammad A Siddiqi
(74) *Attorney, Agent, or Firm* — Schwegman Lundberg & Woessner, P.A.

(57) ABSTRACT

A method and apparatus for managing a transfer of data in a data network identifies data associated with a communication session between a first node and a second node in the data network. Further processing of the communication session occurs when a portion of the communication session meets a criterion and the communication session is permitted to continue when the portion of the communication session does not meet the criterion.

13 Claims, 8 Drawing Sheets

(56) References Cited

U.S. PATENT DOCUMENTS

| | | | |
|---|---|---|---|
| 6,751,671 B1 | 6/2004 | Urien | |
| 6,938,085 B1* | 8/2005 | Belkin et al. | 709/227 |
| 6,981,280 B2 | 12/2005 | Grupe | |
| 7,042,871 B2 | 5/2006 | Gallant et al. | |
| 7,107,464 B2 | 9/2006 | Shapira et al. | |
| 7,127,613 B2 | 10/2006 | Pabla et al. | |
| 7,134,143 B2 | 11/2006 | Stellenberg et al. | |
| 7,260,079 B1 | 8/2007 | Chapman et al. | |
| 7,260,823 B2 | 8/2007 | Schlack et al. | |
| 7,277,944 B1 | 10/2007 | Davie et al. | |
| 7,360,099 B2 | 4/2008 | DiFalco et al. | |
| 7,383,573 B2 | 6/2008 | Coley et al. | |
| 7,451,489 B2 | 11/2008 | Cantrell et al. | |
| 7,526,800 B2 | 4/2009 | Wright et al. | |
| 7,554,949 B2* | 6/2009 | Chen | 370/331 |
| 7,562,393 B2 | 7/2009 | Buddhikot et al. | |
| 7,565,694 B2 | 7/2009 | Appanna et al. | |
| 7,583,632 B2* | 9/2009 | Janevski et al. | 370/331 |
| 7,584,505 B2 | 9/2009 | Mondri et al. | |
| 7,607,170 B2 | 10/2009 | Chesla | |
| 7,644,275 B2 | 1/2010 | Mowers et al. | |
| 7,760,737 B2 | 7/2010 | Rana et al. | |
| 7,817,802 B2 | 10/2010 | Kitaj et al. | |
| 7,900,042 B2 | 3/2011 | Hall et al. | |
| 8,024,797 B2 | 9/2011 | Kohlenberg et al. | |
| 8,166,547 B2 | 4/2012 | Bevan et al. | |
| 8,856,884 B2 | 10/2014 | Bevan et al. | |
| 2002/0013910 A1 | 1/2002 | Edery et al. | |
| 2002/0133721 A1* | 9/2002 | Adjaoute | 713/201 |
| 2002/0184507 A1 | 12/2002 | Makower et al. | |
| 2003/0212903 A1* | 11/2003 | Porras et al. | 713/200 |
| 2004/0008645 A1* | 1/2004 | Janevski et al. | 370/331 |
| 2004/0015723 A1 | 1/2004 | Pham et al. | |
| 2004/0015724 A1 | 1/2004 | Pham et al. | |
| 2004/0073800 A1 | 4/2004 | Shah et al. | |
| 2004/0078568 A1 | 4/2004 | Pham et al. | |
| 2004/0098458 A1 | 5/2004 | Husain et al. | |
| 2004/0107342 A1 | 6/2004 | Pham et al. | |
| 2004/0151192 A1 | 8/2004 | Trossen | |
| 2004/0165588 A1* | 8/2004 | Pandya | 370/389 |
| 2004/0255167 A1 | 12/2004 | Knight | |
| 2005/0018659 A1 | 1/2005 | Gallant et al. | |
| 2005/0021943 A1 | 1/2005 | Ikudome et al. | |
| 2005/0028013 A1 | 2/2005 | Cantrell et al. | |
| 2005/0044422 A1 | 2/2005 | Cantrell et al. | |
| 2005/0108568 A1* | 5/2005 | Bussiere et al. | 713/201 |
| 2005/0182958 A1 | 8/2005 | Pham et al. | |
| 2005/0182966 A1 | 8/2005 | Pham et al. | |
| 2006/0031571 A1 | 2/2006 | Banerjee et al. | |
| 2007/0050846 A1 | 3/2007 | Xie et al. | |
| 2007/0053382 A1 | 3/2007 | Bevan et al. | |
| 2007/0071200 A1 | 3/2007 | Brouwer | |
| 2007/0094725 A1 | 4/2007 | Borders | |
| 2007/0192587 A1 | 8/2007 | Yato et al. | |
| 2007/0266241 A1 | 11/2007 | Wu et al. | |
| 2008/0177829 A1 | 7/2008 | Banerjee et al. | |
| 2008/0183623 A1 | 7/2008 | Xu et al. | |
| 2009/0119759 A1 | 5/2009 | Taugbol | |
| 2010/0024036 A1 | 1/2010 | Morozov et al. | |
| 2010/0150328 A1 | 6/2010 | Perreault et al. | |
| 2010/0153706 A1 | 6/2010 | Haddad | |
| 2011/0231649 A1 | 9/2011 | Bollay et al. | |
| 2011/0231652 A1 | 9/2011 | Bollay et al. | |
| 2011/0231655 A1 | 9/2011 | Bollay et al. | |
| 2012/0005357 A1 | 1/2012 | Hellgren | |
| 2012/0005474 A1 | 1/2012 | Bourret et al. | |
| 2012/0023557 A1 | 1/2012 | Bevan et al. | |
| 2014/0366089 A1 | 12/2014 | Bevan et al. | |

OTHER PUBLICATIONS

"ASICs give a big boost to antivirus", Stefan Dubowski; 1 page; converted to PDF originally from, http://www.itworldcanada.com/news/asics-give-a-big-boost-to-antivirus-/118971, (May 16, 2003).

"U.S. Appl. No. 13/250,285 , Response filed Jan. 9, 2013 to Final Office Action mailed Oct. 10, 2012", 8 pgs.

"U.S. Appl. No. 13/250,285, Final Office Action mailed Oct. 10, 2012", 18 pgs.

"U.S. Appl. No. 13/250,285, Non Final Office Action mailed Apr. 25, 2013", 19 pgs.

"U.S. Appl. No. 13/250,285, Response filed Sep. 5, 2012 to Non Final Office Action mailed Jun. 5, 2012", (8 pgs).

"U.S. Appl. No. 13/250,285 , Response filed Aug. 23, 2013 to Non Final Office Action mailed Apr. 25, 2013", 8 pgs.

"U.S. Appl. No. 13/250,285, Final Office Action mailed Sep. 30, 2013", 26 pgs.

"U.S. Appl. No. 13/250,285, Notice of Allowance mailed Aug. 8, 2014", 14 pgs.

"U.S. Appl. No. 13/250,285, Response filed Jun. 9, 2014 to Non Final Office Action mailed Feb. 13, 2014", 9 pgs.

"U.S. Appl. No. 14/469,285, Preliminary Amendment filed Aug. 26, 2014", 6 pgs.

"U.S. Appl. No. 11/220,762 Final Office Action mailed Jul. 8, 2010", 11 Pgs.

"U.S. Appl. No. 11/220,762, Final Office Action mailed Oct. 21, 2011", 11 pgs.

"U.S. Appl. No. 11/220,762, Non Final Office Action mailed Mar. 11, 2011", 12 pgs.

"U.S. Appl. No. 11/220,762, Non Final Office Action mailed Oct. 7, 2009", 8 pgs.

"U.S. Appl. No. 11/220,762, Non-Final Office Action mailed Jan. 25, 2010", 12 pgs.

"U.S. Appl. No. 11/220,762, Notice of Allowance mailed Mar. 16, 2012", 16 pgs.

"U.S. Appl. No. 11/220,762, Response filed Feb. 20, 2012 to Final Office Action mailed Oct. 21, 2011", 7 pgs.

"U.S. Appl. No. 11/220,762, Response filed Apr. 23, 2010 to Non Final Office Action mailed Jan. 25, 2010", 7 pgs.

"U.S. Appl. No. 11/220,762, Response Filed Aug. 9, 2011 to Non-Final Office Action Received Mar. 11, 2011", 7 pgs.

"U.S. Appl. No. 11/220,762, Response filed Oct. 9, 2009 to Restriction Requirement mailed Oct. 7, 2009", 8 pgs.

"U.S. Appl. No. 11/220,762, Response filed Dec. 8, 2010 to Final Office Action mailed Jul. 8, 2010", 6 pgs.

Bevan, Stephen J, et al., "Mehtod, Apparatus, Signals, and Medium for Managing Transfer of Data in a Data Network", (Jan. 26, 2012).

"U.S. Appl. No. 13/250,285, Non Final Office Action mailed Feb. 13, 2014", 32 pgs.

"U.S. Appl. No. 13/250,285, Response filed Dec. 30, 2013 to Final Office Action mailed Sep. 30, 2013", 8 pgs.

* cited by examiner

| State | Action | Policy | Match | Status |
|---|---|---|---|---|
| 00 | Allow data associated with the communication session to be transferred, while continuing to perform signature analysis on further data associated with the communications session | X | No Match | Not enough data recieved |
| 01 | Allow data associated with the communication session to be transferred with no further signature analysis. | X | No Match | Enough data recieved |
| 10 | Allow the data associated with the communication session to be transferred after further processing. | Log, proxy etc | Match | X |
| 11 | Do not allow the data to be transferred. | Drop | Match | X |

(In the above table "X" indicates "don't care".)

FIG. 8

METHOD, APPARATUS, SIGNALS, AND MEDIUM FOR MANAGING TRANSFER OF DATA IN A DATA NETWORK

RELATED APPLICATION

This application claims priority to U.S. patent application Ser. No. 11/220,762 filed on Sep. 6, 2005 entitled METHOD, APPARATUS, SIGNALS, AND MEDIUM FOR MANAGING A TRANSFER OF DATA IN A DATA NETWORK, the entire disclosures of which are expressly incorporated herein by reference.

BACKGROUND OF THE INVENTION

1. Field of Invention

This invention relates generally to computer networks and network security, and more particularly to a method, apparatus, signals, and medium for managing a data transfer on a data network.

2. Description of Related Art

The rapid expansion of high-speed Internet connections and the use of the World Wide Web for commerce, entertainment, and education has provided significant benefits to the global user community. The wide-spread, low cost, and continuous availability of web-based information services has resulted in developments ranging from new business models to portals which provide access to government and education services, to the rapid and free exchange of ideas and information for all members of the Internet community.

Companies have come to increasingly rely on their internal and external networks for information dissemination, service delivery, communications, and data storage, for example. Companies have become particularly vulnerable to disruptions to both internal and external network services. Such disruptions may occur from, for example, malicious code such as computer viruses that may be transmitted via email or other file transfers from an external network. Companies may also need to protect sensitive information in their internal network from access by unauthorized users. At the same time companies have to deal with an ever increasing number of communication and file transfer services, such as instant messaging and peer-to-peer file sharing. The use of such services by employees of a company may expand to occupy a substantial portion of available bandwidth in a company network. Much of the traffic may be frivolous communication, while at the same time distracting workers from assigned tasks.

There is thus a desire to exercise some control over such traffic in both internal and external networks. For example, company policy may dictate that all instant messaging and peer-to-peer traffic between any computer on the company network and any computer outside the company network must be subject to one or more policy rules. Such policy rules may include completely blocking access to certain applications.

Similarly, there may also be a need to monitor and control non-frivolous work-related communications and other data transfers, which may inadvertently subject the internal company network to viruses, intrusion attempts or other unauthorized uses.

While such monitoring and controlling of traffic is in many instances highly desirable, such processes may require the provision of additional computer resources. Depending on the company's network management policies, the monitoring and controlling of data transfers may place a substantial overhead on the operation of the network and may result in unacceptable delays in transferring data from internal to external networks, particularly where there are a large number of network management policies in place.

SUMMARY

In accordance with one aspect of the invention, there is provided a method for managing a transfer of data between a first node and a second node in a data network. The method involves identifying data associated with a communication session between the first node and the second node. The method also involves further processing the communication session when a portion of the communication session meets a criterion, and permitting the communication session to continue when the portion of the communication session does not meet the criterion.

The transfer of data may involve a plurality of data packets and identifying data associated with the communication session may involve identifying particular data packets associated with the communication session.

Identifying particular data packets associated with the communication session may involve reading data packets transmitted by at least one of the first node and the second node.

Identifying particular data packets associated with the communication session may involve reading a header associated with each of the plurality of data packets.

Reading the header may involve reading and at least one of a source address field, a destination address field, a source port field, a destination port field, and a protocol field.

The method may further involve labeling the particular data packets to indicate that the particular data packets are associated with the communication session.

Labeling the particular data packets may involve associating a data label with the particular data packets.

The method may involve determining whether the data packets comply with an Internet Protocol (IP).

The method may involve determining whether the data packets comply with a Transport Control Protocol (TCP).

The method may involve identifying a signature associated with the data associated with the communication session.

Identifying the signature may involve identifying a pattern in the data associated with the communication session.

Identifying the signature may involve performing signature analysis on the data associated with the communication session.

Identifying the signature may involve determining whether the data associated with the communication session complies with a data transfer protocol.

Identifying the signature may involve determining whether the data associated with the communication session is addressed to a particular destination.

Further processing may involve dropping the communication session.

Further processing may involve at least one of logging at least a portion of the communication session, limiting a bandwidth allocation associated with the communication session, altering at least a portion of the data associated with the communication session, causing a message to be transmitted to at least one of the first node and the second node, configuring a network resource to permit the communication session to proceed, and scanning the data associated with the communication session for data patterns that indicate the presence of malicious code.

Further processing may involve terminating the communication session at a third node and dividing the communication session into a first communication session between the first node and the third node and a second communication session between the third node and the second node, the third node acting as a proxy node.

Permitting the communication session to continue may involve permitting the communication session to continue on a first data transfer path and further processing may involve diverting the communication session to a second data transfer path, the second data transfer path being slower than the first data transfer path.

Permitting the communication session to continue when the portion of the communication session does not meet the criterion may involve permitting a first portion of the communication session to continue while determining whether another portion of the communication session meets the criterion.

The transfer of data may involve a plurality of data packets and permitting a first portion of the communication session to continue may involve permitting a first plurality of data packets associated with the communication session to be transferred while determining whether at least one subsequent data packet associated with the communication session meets the criterion.

The method may involve associating a label with the data associated with the communication session responsive to whether or not the portion of the communication session meets the criterion.

The communication session may be a first communication session and the first communication session may originate a second communication session and the method may involve further processing the second communication session regardless of whether the second communication session meets the criterion.

In accordance with another aspect of the invention, there is provided a computer readable medium encoded with codes for directing a processor circuit to carry out the above method and its variants.

In accordance with another aspect of the invention, there is provided a computer readable signal encoded with codes for directing a processor circuit to carry out the above method and its variants.

In accordance with another aspect of the invention there is provided an apparatus for managing a transfer of data in a data network. The apparatus may include provisions for identifying data associated with a communication session between a first node and a second node in the data network. The apparatus may also include provisions for further processing the communication session when a portion of the communication session meets a criterion, and provisions for permitting the communication session to continue when the portion of the communication session does not meet the criterion.

The transfer of data may include a plurality of data packets and the provisions for identifying data associated with the communication session may include provisions for identifying particular data packets associated with the communication session.

The provisions for identifying particular data packets associated with the communication session may include provisions for reading data packets transmitted by at least one of the first node and the second node.

The provisions for identifying particular data packets associated with the communication session may include provisions for reading a header associated with each of the plurality of data packets.

The provisions for reading the header may include provisions for reading at least one of a source address field, a destination address field, a source port field, a destination port field, and a protocol field.

The apparatus may include provisions for labeling the particular data packets to indicate that the particular data packets are associated with the communication session.

The provisions for labeling the particular data packets may include provisions for associating a data label with the particular data packets.

The apparatus may include provisions for determining whether the data packets comply with an Internet Protocol (IP).

The apparatus may further include provisions for determining whether the data packets comply with a Transport Control Protocol (TCP).

The apparatus may further include provisions for identifying a signature associated with the data associated with the communication session.

The provisions for identifying the signature may include provisions for identifying a pattern in the data associated with the communication session.

The provisions for identifying the signature may include provisions for performing signature analysis on the data associated with the communication session.

The provisions for identifying the signature may include provisions for determining whether the data associated with the communication session complies with a specific data transfer protocol.

The provisions for identifying the signature may include provisions for determining whether the data associated with the communication session is addressed to a specific destination.

The provisions for further processing may include provisions for dropping the communication session.

The provisions for further processing may include at least one of provisions for logging at least a portion of the communication session, provisions for limiting a bandwidth allocation associated with the communication session, provisions for altering at least a portion of the data associated with the communication session, provisions for causing a message to be transmitted to at least one of the first node and the second node, provisions for configuring a network resource to permit the communication session to proceed, and provisions for scanning the data associated with the communication session for data patterns that indicate the presence of malicious code.

The provisions for further processing may include provisions for terminating the communication session at a third node and provisions for dividing the communication session into a first communication session between the first node and the third node and a second communication session between the third node and the second node, the third node acting as a proxy node.

The provisions for permitting the communication session to continue may include provisions for permitting the communication session to continue on a first data transfer path and the provisions for further processing the communication session may include provisions for diverting the communication session to a second data transfer path, the second data transfer path being slower than the first data transfer path.

The provisions for permitting the communication session to continue when the portion of the communication session does not meet the criterion may include provisions for permitting a first portion of the communication session to continue while determining whether another portion of the communication session meets the criterion.

The transfer of data may include a plurality of data packets and the provisions for permitting a first portion of the communication session to continue may include provisions for permitting a first plurality of data packets associated with the communication session to be transferred while determining whether at least one subsequent data packet associated with the communication session meets the criterion.

The communication session may be a first communication session and the first communication session may originate a second communication session and apparatus may include provisions for further processing the communication session regardless of whether the second communication session meets the criterion.

The apparatus may include provisions for associating a label with the data associated with the communication session in accordance with whether the portion of the communication session meets the criterion or does not meet the criterion.

In accordance with another aspect of the invention, there is provided an apparatus for managing a data transfer between a first node and a second node in a data network. The apparatus includes a processor circuit and a memory encoded with codes for directing the processor circuit to perform the above method and its variants.

In accordance with another aspect of the invention, there is provided an apparatus for managing a transfer of data in a data network. The apparatus includes a session identifier operably configured to identify data associated with a communication session between a first node and a second node in the data network. The apparatus further includes a session controller having an input for receiving a control signal indicating whether the communication session meets a criterion. The session controller is responsive to the control signal to produce a signal to indicate whether or not the communication session should be permitted to continue or should be subjected to further processing.

The apparatus may include a signature analyzer operably configured to produce the control signal in response to identifying a signature associated with the data associated with the communication session.

The signature may include a pattern characteristic of a particular type of data transfer.

The signature may include a data protocol identifier.

The signature may include an address field.

The signature analyzer may include a hardware circuit which may include discrete logic components.

The signature analyzer may include an application specific integrated circuit (ASIC).

The apparatus may include a further processing module operably configured to perform the further processing, the further processing module including a third node operably configured to divide the communication session into a first communication session between the first node and the third node and a second communication session between the third node and the second node, the third node acting as a proxy node.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
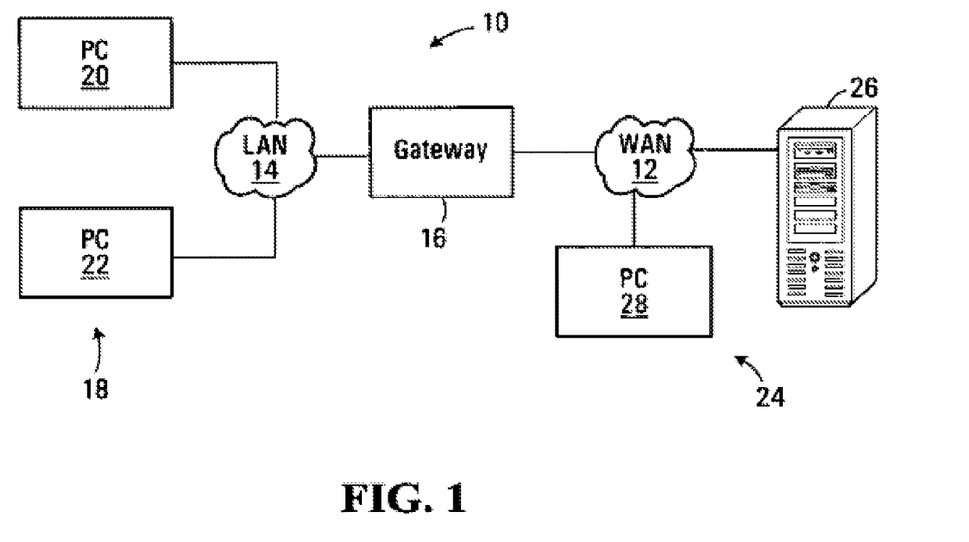
FIG. 1 is a schematic diagram of a data communication system in accordance with one embodiment of the invention.

Referring to FIG. 1, a data communication system according to a first embodiment of the invention is shown generally at 10. The system includes a Wide Area Network 12 (WAN), such as an intranet or Internet, a Local Area Network (LAN) 14, and a gateway 16 connecting the WAN to the LAN. The LAN 14 includes a plurality of nodes shown generally at 18, which may include networked devices such as personal computers 20 and 22, but may also include, for example, other devices such as server computers, routers, wireless access points, input devices, and output devices. The WAN 12 also includes a plurality of nodes shown generally at 24, which may include a server 26 and a personal computer 28. The server 26 may be an Instant Messaging (IM) mediation server that facilitates an instant messaging data transfer between personal computers 20 and 22 and the personal computer 28. Alternatively the server may be a computer running a program that receives and processes requests for information from other nodes connected directly to the WAN, such as the personal computer 28, or nodes connected to the WAN through the gateway 16 and the LAN 14, such as personal computers 20 and 22.

Generally the above components cooperate to manage a transfer of data between a first node and a second node in a data network by identifying data associated with a communication session between the first node and the second node and further processing the communication session when a portion of the communication session meets a criterion or permitting the communication session to continue when the portion of the communication session does not meet the criterion.

In one embodiment the transfer of data may include file or message data that has been formatted into one or more data packets. Each data packet includes a header portion and a data portion. The header portion includes fields including information related to the source and/or destination of the data packet. The data portion of the data packet includes the file or message data. If the file or message data is too large to be transmitted in a single packet, it may be split up over several packets, in which case the header portion may also include information related to the sequence of the data packets thus facilitating correct re-assembly of the file or message data at the destination.

Figure 2:
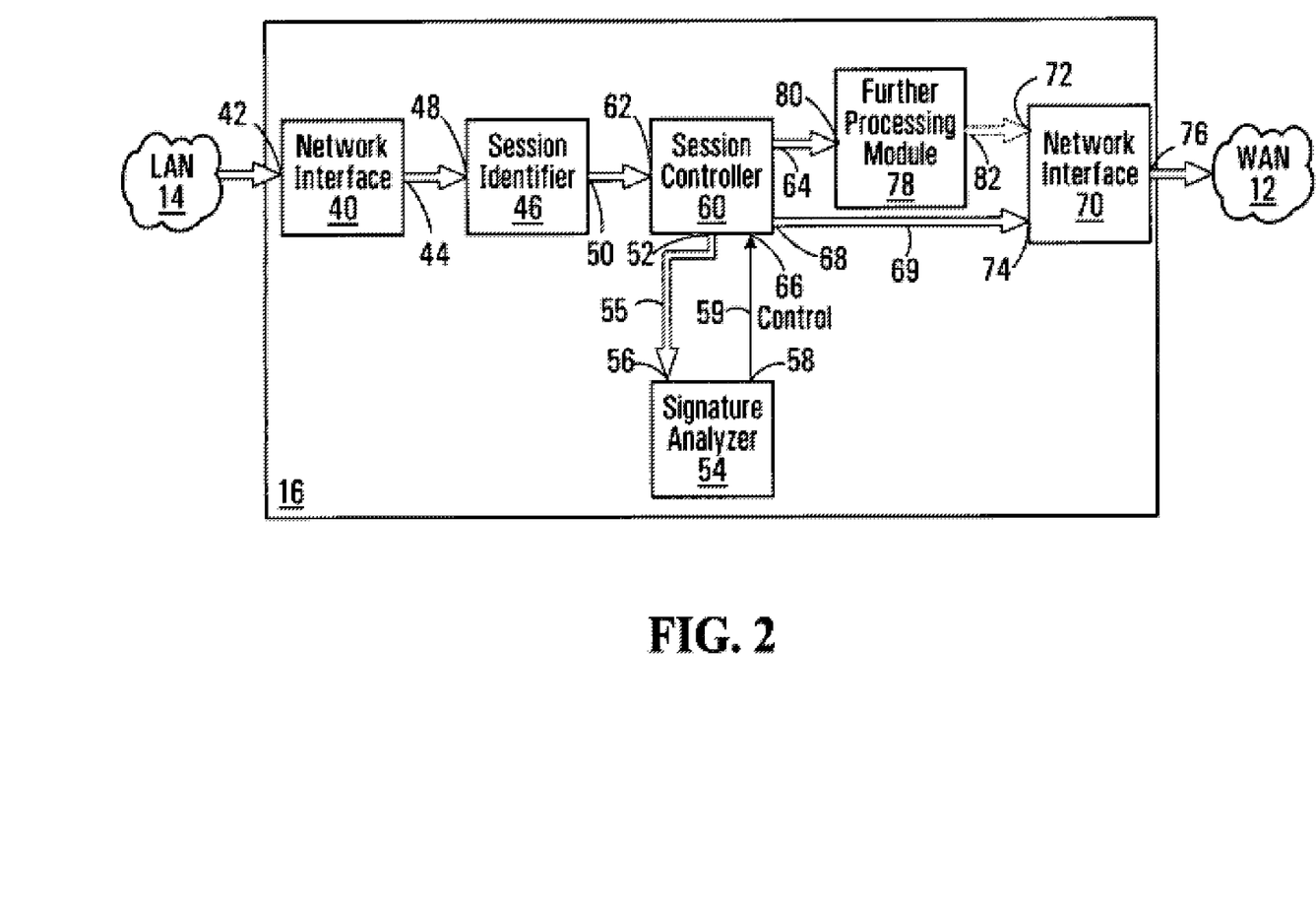
FIG. 2 is a schematic diagram of one embodiment of a gateway used in the data communication system shown in FIG. 1.

The gateway 16 manages the transfer of data packets between the LAN 14 and the WAN 12 and is shown in greater detail in FIG. 2. The gateway includes a network interface 40, which includes an input 42 and a data output 44. The input 42 is in communication with the LAN 14. The network interface 40 includes circuitry that receives signals representing data packets to be transferred at the input 42 and converts the signals into data packets at the data output 44. In one embodiment the data at the data output 44 may be data packets formatted in accordance with the Internet Protocol (IP). The network interface 40 may be an Ethernet interface or a wireless interface, or any other network interface that facilitates the transfer of data between nodes in a data communication system.

The gateway 16 further includes a session identifier 46, which includes a data input 48 and a data output 50. The data input 48 is in communication with the data output 44 of the network interface 40. The session identifier 46 receives data packets at the data input 48 and reads the data packets to identify which packets should be associated with a communication session, before forwarding the data packets on to the data output 50.

A communication session involves the exchange of data packets between nodes that are in communication over a data network. For example, Transmission Control Protocol (TCP) data transfers allow a communication session to be established between a first node and a second node. TCP communication sessions include session establishment, a data transfer, and session termination. The session establishment takes place via a three-way handshake before the actual data transfer is able to proceed. During the session establishment, parameters such as sequence numbers are initialized to help ensure ordered and robust delivery of data packets. Termination of a TCP session takes place via a four-way handshake. TCP data packets include a TCP header and a data portion. The header portion includes information such as a source port and a destination port. Details of the Transmission Control Protocol are contained in the document "RFC: 793: TRANSMISSION CONTROL PROTOCOL, DARPA INTERNET PROGRAM, PROTOCOL SPECIFICATION, September 1981", which is incorporated herein by reference.

In contrast, some data transfer protocols, such as the Internet Protocol (IP), provide almost no guarantees in respect of delivery of the data packet, which may arrive damaged, out of order, may be duplicated, or may have been dropped entirely. When sending IP data packets from a first node to a second node, which have not previously communicated, no prior setup is required. Accordingly, the Internet Protocol does not provide for the establishment of a communication session, and if reliable data transfer is required, it may be provided by transporting data according to an upper level protocol. For example, TCP data packets may be transported in the data portion of an IP data packet, in which case the data transfer is referred to as TCP over IP or TCP/IP. Details of the Internet Protocol are contained in the document "RFC: 791: INTERNET PROTOCOL, DARPA INTERNET PROGRAM, PROTOCOL SPECIFICATION, September 1981", which is incorporated herein by reference.

The gateway 16 further includes a session controller 60, which includes a data input 62, a control signal input 66, and first, second and third data outputs 52, 64 and 68. The session controller 60 receives data packets from the data output 50 of the session identifier 46 and forwards the data packets to one or more of the first, second and third data outputs 52, 64 and 68 in response to a control signal received at the control signal input 66.

The gateway 16 also includes a signature analyzer 54, which includes a data input 56 and a control signal output 58. The data input 56 is in communication with the data output 52 from the session controller 60, via a data line 55. The control signal output 58 is in communication with the control signal input 66 of the session controller 60, via a control signal line 59. The signature analyzer 54 receives data packets from the session controller 60 at the data input 56 and determines whether any portion of the data packets meets a criterion. The signature analyzer produces a control signal at the control signal output 58, which indicates whether or not a particular data packet meets the criterion.

Figure 3:
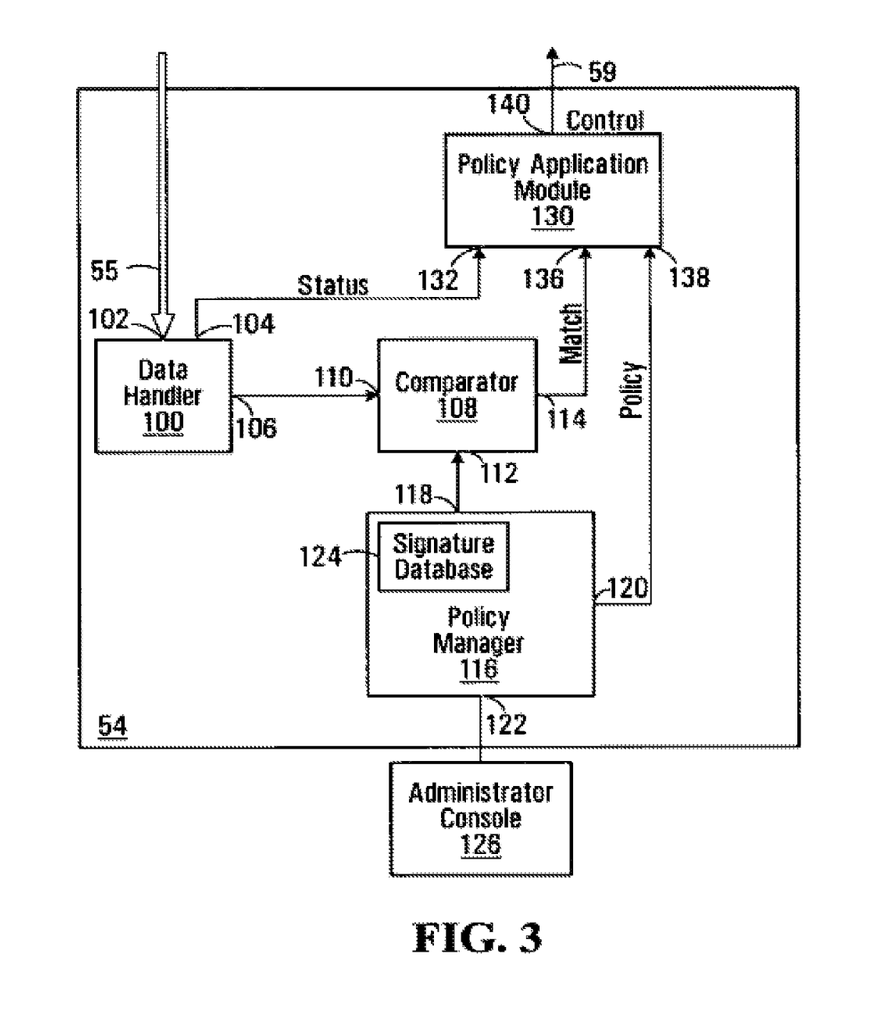
FIG. 3 is a schematic diagram of one embodiment of a signature analyzer used in the gateway shown in FIG. 2.

The signature analyzer 54 is shown in greater detail in FIG. 3. The signature analyzer 54 includes a data handler 100, which includes a data input 102, an output 104 for producing a status signal, and a data output 106. The data handler 100 receives data packets from the session identifier 46 at the data input 102, and performs functions such as data packet re-assembly.

The signature analyzer 54 also includes a policy manager 116, which includes a signature database 124 for storing a plurality of data signatures. Each signature stored in the signature database 124 may include a data pattern that is characteristic of a particular type of data transfer. A signature may also include user names, source or destination addresses, source or destination ports, or a protocol identifier, for example. In this embodiment the criterion is met for a particular communication session when any of the signatures stored in the signature database match data associated with the particular communication session.

In one embodiment the signature database 124 may also store a plurality of policies to be followed in the event of a match to a particular signature, in which case each signature stored in the signature database includes an associated policy, which may also be stored in the signature database. The policy manager 116 also includes a signature signal output 118 for producing signature signals and a policy signal output 120 for producing policy signals representing the signatures and policies stored in the signature database 124.

The policy manager 116 also includes a communication port 122, which facilitates connection to the policy manager 116 by a system administrator via an administrator console 126 for updating or maintenance of network management policies and/or signatures. The communication port 122 may be a connection to a LAN.

In this embodiment the signature analyzer 54 includes a comparator 108, which includes a data input 110, a signature input 112, and a match signal output 114. The comparator 108 receives data at the data input 110 from the data output 106 of the data handler 100, and compares the data to signatures received on the signature input 112. The comparator 108 produces a match signal at the output 114 when a signature matches any portion of the data received at the data input 110, thus indicating that data associated with the communication session meets the criterion.

The signature analyzer 54 also includes a policy application module 130, which includes a first input 132 for receiving the status signal from the data handler 100, a second input 136 for receiving the match signal from the comparator 108, and a third input 138 for receiving the policy signal from the policy manager 116. The policy application module 130 also includes an output 140 for producing the control signal on the control signal line 59. The policy application module functions to produce a control signal at the output 140 in response to the status signal, the match signal, and the policy signal received on the first, second and third inputs 132, 136, and 138 respectively.

In one embodiment the signature analyzer 54 may be partly or fully implemented using a hardware logic circuit including discrete logic circuits and/or an application specific integrated circuit (ASIC). Alternatively the signature analyzer 54 may be implemented using a processor circuit.

Referring back to FIG. 2, the gateway 16 also includes a further processing module 78, which includes a data input 80. The data input 80 is in communication with the data output 64 of the session controller 60. The further processing module 78 receives data packets from the session controller 60 when the control signal indicates that the data packets associated with the communication session meet the criterion. The further processing module 78 performs one or more further processing functions on the data packets, such as logging the data packets. In one embodiment the further processing module 78 simply drops the data packets after they have been logged (i.e. does not forward the data packets on). In another embodiment the further processing module 78 may include a data output 82 for forwarding the data packets after performing the further processing.

The gateway 16 further includes a network interface 70, which includes first and second data inputs 74 and 72 and a data output 76. The first data input 74 is in direct communication with the data output 68 of the session controller 60 via a fast data transfer path 69. In one embodiment, the data input 72 is in communication with the data output 82 of the further processing module 78 and may receive data packets from the session controller 60 after they have been processed by the further processing module 78. The data output 76 of the network interface 70 is in communication with the WAN 12. The network interface 70 receives data packets at either of the first and second data inputs 74 and 72 and converts the data packets into signals representing the data packets, thus facilitating transmission of the data packets over the WAN 12.

Figure 4:
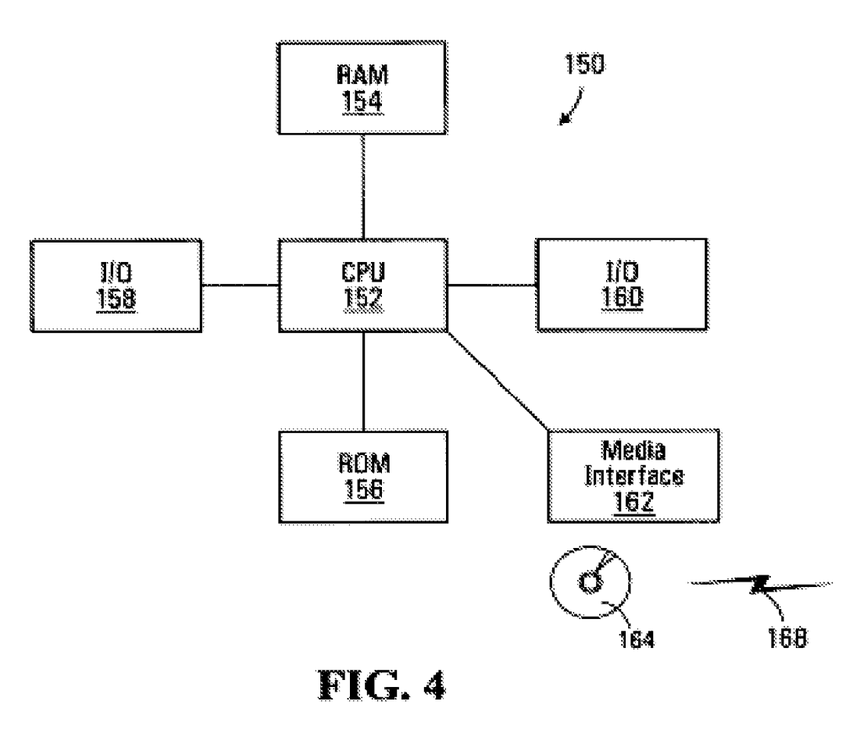
FIG. 4 is a block diagram of a processor circuit for implementing a session identifier used in the gateway shown in FIG. 2.

Referring to FIG. 2, the session identifier 46 may be implemented using a processor circuit shown generally at 150 in FIG. 4. Referring to FIG. 4 the processor circuit 150 includes a central processing unit (CPU) 152, a random access memory (RAM) 154, a read-only memory (ROM) 156, and input/output interfaces (I/O) 158 and 160. The processor circuit also includes a media interface 162, which facilitates loading program codes into the ROM 156 or the RAM 154 from a computer readable medium 164, such as a CD ROM, or from a computer readable signal 168, such as provided by an Internet connection, for directing the processor circuit to carry out functions according to a method associated with one aspect of the invention.

Figure 5:
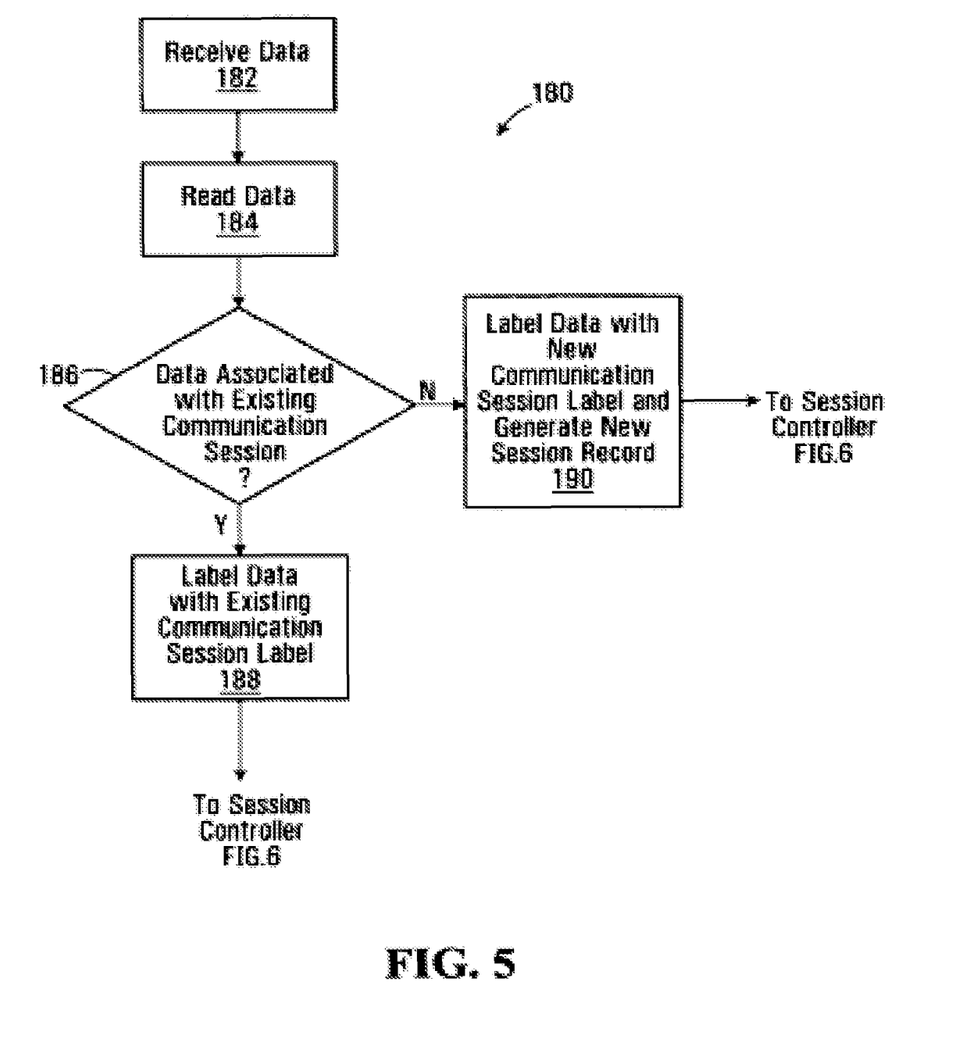
FIG. 5 is a flowchart including blocks representing codes executed by the processor circuit of FIG. 4 to implement the session identifier shown in FIG. 2.

A flowchart depicting blocks of code for causing the processor circuit 150 to implement the session identifier 46 is shown in FIG. 5 at 180. The blocks generally represent code that may be stored in the RAM 154 or the ROM 156 for directing the CPU 152 to carry out a session identifier process. The actual code to implement each block may be written in any suitable programming language such as C, C++, and/or assembler code, for example.

The process begins with a first block of codes 182, which directs the CPU 152 to cause the I/O 158 to receive a data packet from the network interface 40 and to store the data packet in the RAM 154.

Block 184 then directs the CPU 152 to read a portion of the data packet to determine whether the data packet should be associated with a communication session. For example, where the data packet is transferred using IP, a communication session may be partially identified by reading an IP source address field and an IP destination address field in the data packet header portion, to uniquely identify data packets being transferred between a first node and a second node.

However, IP data transfers between the nodes at the source address and the destination address may include several different communication sessions, such as TCP communication sessions, or other data transfers according to protocols that do not implement communication sessions at all. In this case it is necessary to determine what protocol the data in the IP data packet portion complies with.

The protocol may be determined by reading an IP protocol identifier field in the IP data packet header (which may have the value "6" for a TCP data transfer for example). Once the data transfer protocol is established, the existence of a communication session may be determined by reading appropriate fields in the IP data portion. For example, where the IP data portion complies with the Transmission Control Protocol, a TCP source port, and a TCP destination port may be read to uniquely identify a communication session between the first and second nodes. The various fields that are read to determine whether the data should be associated with a communication session are hereinafter referred to session identification fields.

Returning to FIG. 5, the block 184 directs the CPU 152 to read the session identification fields in the data packet being transferred. In one embodiment the CPU 152 maintains a session table (not shown) in the RAM 154, which records details of all active communication sessions. The session table includes a session record for each active communication session. The session record includes session identification fields such as the IP source and destination addresses, the IP protocol field, TCP source and destination ports, and any other fields that may be used to identify a communication session under a particular data transfer protocol. Each session record also includes a field for storing a unique communication session label which uniquely identifies a corresponding communication session. The unique communication session label may be a number from a series of arbitrary numbers.

Block 186 directs the CPU 152 to compare the session identification fields for the data packet being transferred to session records in the session table. If the data packet includes session identification fields that correspond to fields in a session record for an existing communication session included in the session table, the CPU is directed to block 188. Block 188 directs the CPU 152 to label the data packet with the communication session label corresponding to the session record. For example, the label may be associated with the data packet by appending the label to the data packet.

If the communication session does not yet exist, the CPU 152 is directed to block 190, which causes it to add a new session record to the session table. The new session record includes a new communication session label and the session identification fields for the data packet being transferred. Block 190 also directs the CPU 152 to label the data packet with the corresponding new communication session label.

The operation of the signature analyzer 54 is described in relation to FIG. 2 and FIG. 3. The signature analyzer 54 receives a data packet, which has been labeled with a unique communication session label, from the session controller 60, at the data input 102 of the data handler 100. In one embodiment, where the data has been split and transferred in a plurality of data packets, the data handler 100 may re-assemble the data packets into order, and may re-combine at least a portion of the data packets so that the signature analyzer 54 will be able determine whether data spanning one or more data packets meets the criterion. The data handler 100 produces a status signal at the output 104. The status signal includes a representation of the unique communication session label and other information relating to the data packets received. For example, the status signal may include information relating to a count of the number of data packets received for a particular communication session. The status signal may also include an indication of whether sufficient data has been received to perform signature analysis. For example, the status signal may be used to indicate that a pre-determined number of bytes have been received by the data handler 100. The data handler 100 then forwards the re-assembled data to the data input 110 of the comparator 108.

The comparator 108 temporarily stores a copy of the data, which may include data from a single data packet or a plurality of data packets. The policy manager 116 functions to look up a signature in the signature database 124, and produces a signature signal at the signature signal output 118 corresponding to the signature. Generally the signature database 124 includes a plurality of signatures and the policy manager 116 sequentially looks up each signature and produces corresponding signature signals. The comparator 108 compares the temporarily stored data to the signature signals received from the policy manager 116 at the signature input 112 of the comparator. If a signature matches a portion of the temporarily stored data received at the data input 110, the comparator 108 produces a match signal at the match signal output 114 indicating that a match has been found in the data.

The policy signal includes an indication of a policy action to be performed in the event of a match between the data received at the data input 110 and a particular signature received at the signature input 112. In one embodiment a policy action is associated with each signature and the policy action and signature are stored in the signature database 124, thus allowing different actions to be undertaken depending on the signature that is found in the data.

In one embodiment the policy application module 130 combines the status signal received at the input 132, the match signal received at the input 136, and the policy signal received at the input 138 and produces the control signal at the output 140. In this embodiment the control signal includes four possible states as listed in the table shown in FIG. 8.

Figure 8:
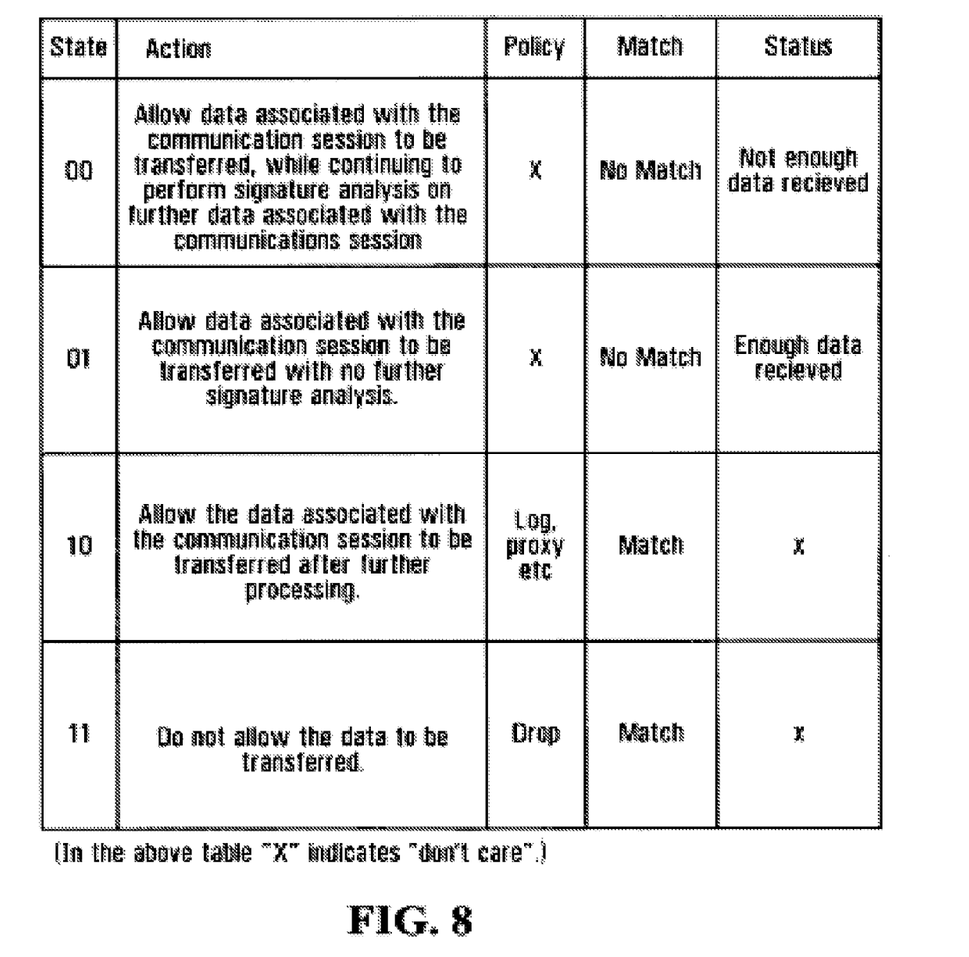
FIG. 8 is a table of control signals generated by the signature analyzer shown in FIG. 3.

The state 00 is assigned by the policy application module 130 when the match signal indicates that no match has yet been found and the status signal indicates that sufficient data packets have not yet been analyzed by the signature analyzer 54 in order to determine whether the data associated with the communication session meets the criteria.

The state 01 is assigned by the policy application module 130 when the match signal indicates that no match has yet been found and the status signal indicates that sufficient data packets have been analyzed by the signature analyzer 54 to consider the communication session safe. In this case signature analysis of the communication session may be discontinued and the signature analyzer 54 no longer needs to receive data packets associated with the communication session.

The state 10 is assigned by the policy application module 130 when the match signal indicates that a match has been found and the policy signal indicates that the communication session should be further processed in the further processing module 78. Such further processing is described later.

The state 11 is assigned by the policy application module 130 when the match signal indicates that a match has been found and the policy signal indicates that the communication session should be dropped (i.e. no further data packets should be transferred). In this case the data may be erased from the RAM 154, or may be transferred to the further processing module 78, where it may be logged, but not transferred.

Figure 6:
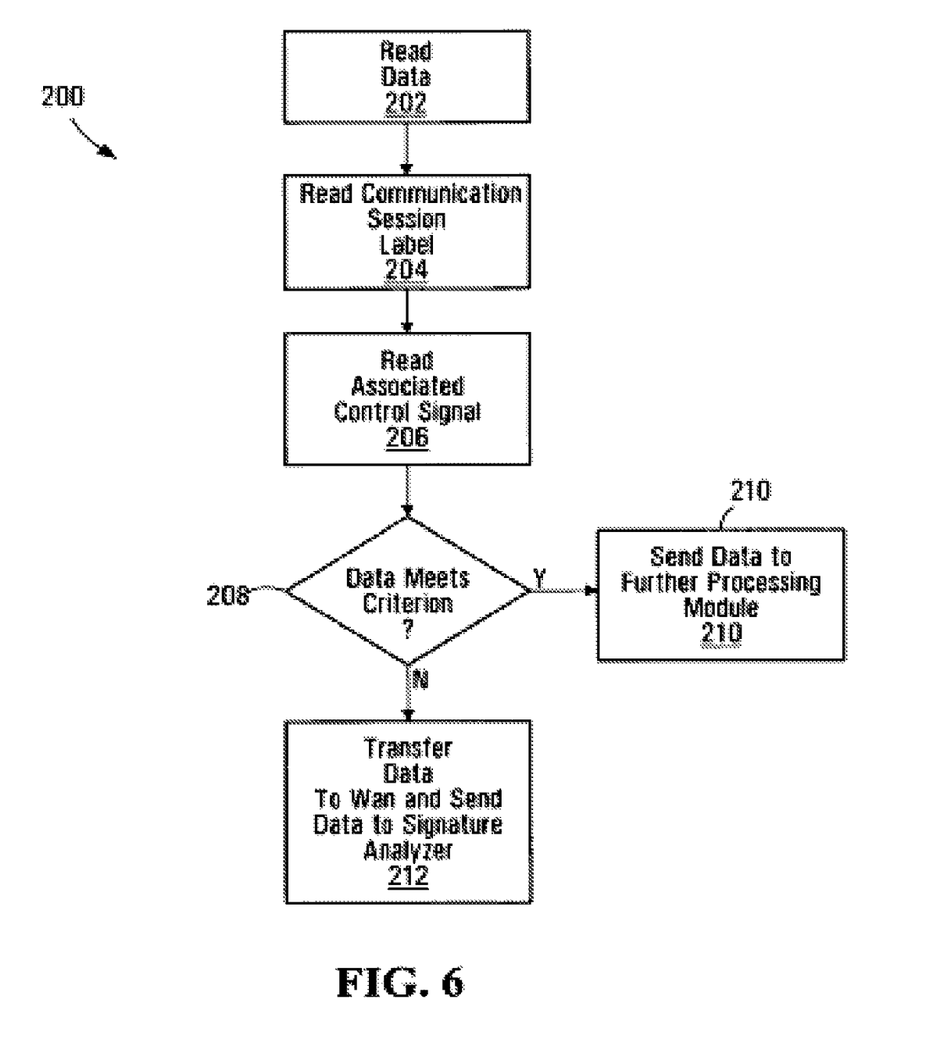
FIG. 6 is a flowchart including blocks representing codes executed by the processor circuit of FIG. 4 to implement a session controller shown in FIG. 2.

Referring to FIG. 2, the session controller 60 may also be implemented using the processor circuit 150. A flowchart depicting blocks of code for causing the processor circuit 150 to implement the session controller 60 in the processor circuit 150 is shown in FIG. 6 at 200. Block 202 directs the CPU 152 to read a data packet from the RAM 154. Block 204 directs the CPU 152 to read the communication session label associated with the data packet.

In one embodiment control signals may be asynchronously received by the session controller as the results of the signature analysis by the signature analyzer 54 become available. Accordingly, when each successive control signal is received at the control signal input 66, the associated communication session label is read and the control signal is stored in a field in the session record corresponding to the communication session label.

If the communication session is a new communication session, an associated control signal may not yet be available from the signature analyzer 54. Accordingly, when a new session record is generated for a new communication session by the session identifier 46, the control signal field is initially set to the "00" state, indicating that the communication session does not meet the criterion. Once a control signal for the new communication session is available, the control signal field in the session record is overwritten, in which case the control signal field may change state after a number of data packets have been analyzed by the signature analyzer 54.

Block 206 directs the CPU 152 to read the control signal from the session table record corresponding to the communication session label for the data packet. Block 208 directs the CPU 152 to determine whether the communication session meets the criterion, as indicated by the control signal state "10" or "11" in the table of FIG. 8. If the data associated with the communication session does meet the criterion, block 210 directs the CPU 152 to send the data to the further processing module 78. If the control signal state is "11", the further processing module 78 drops the communication session by for example, erasing the data packet from the RAM 154.

Alternatively if the control signal state is "10" the further processing module 78 performs some other action. For example the further processing module 78 may cause a log to be made of all, or a portion of the data packets associated with the communication session. The log may be stored in memory for later analysis. The further processing module 78 may limit a bandwidth allocation associated with said communication session so that certain types of traffic (such as instant messaging traffic) will not be permitted to exceed a pre-determined portion of the network bandwidth. The further processing module 78 may also alter data packets associated with the communication session to insert a message or remove certain data. The message may be transmitted to source and/or destination nodes and may indicate that the transfer is subject to restriction in accordance with a network management policy.

Alternatively, in order to proceed, the communication session may require a network resource to be specifically configured. For example, the further processing module 78 may cause a specific TCP port to be temporarily opened, thus permitting a communication session that would not ordinarily be allowed, to proceed.

In one embodiment the further processing module 78 may cause data packets associated with the communication session to be virus scanned to detect the presence of malicious code that may threaten the integrity of the network. Data packets associated with communication sessions that do not meet the criterion may not be scanned for malicious code or may be scanned to a different extent than communication sessions that are diverted to the further processing module 78. Alternatively, out of an abundance of caution, all data packets associated with the communication session may be virus scanned regardless of whether or not the communication session does or does not meet the criterion.

In some cases a communication session may give rise to another communication session. For example an ongoing instant messaging session may initiate a file transfer in a separate communication session. In such cases, where an original communication session has already been determined to meet the criterion and has been diverted to the further processing module 78, the separate communication session may also be diverted to the further processing module 78 without performing signature analysis on data packets associated with the separate communication session.

Returning to FIG. 6, if the data associated with the communication session does not meet the criterion (indicated by the control signal state "00" or "01"), block 208 directs the CPU 152 to block 212 where the CPU 152 causes the I/O 160 to write the data packet to the data output 68, which is in communication with the data input 74 of the network interface 70. The network interface 70 then converts the data into data signals and transmits the data over the WAN 12. If the control signal state is "01", a remaining portion of the communication session is considered safe and permitted to proceed along the fast data path 69.

If the control signal state is "00", block 212 also directs the CPU 152 to permit the communication session to proceed along the fast data path 69, but the session controller 60 continues to forward data packets associated with the communication session to the signature analyzer 54. Thus, the communication session is initially permitted to proceed pending a determination by the signature analyzer 54 as to whether subsequently transferred data packets meet the criterion, in which case a further processing action will be performed.

In another embodiment the session controller 60 may be implemented using a separate processor circuit such as that shown at 150 in FIG. 4. In this case, once the session identifier 46 has labeled the data packets with a communication session label the data packets are written out via the I/O 160. The separate processor circuit then receives the data packets on an I/O interface and stores the data packets in RAM memory.

Figure 7:
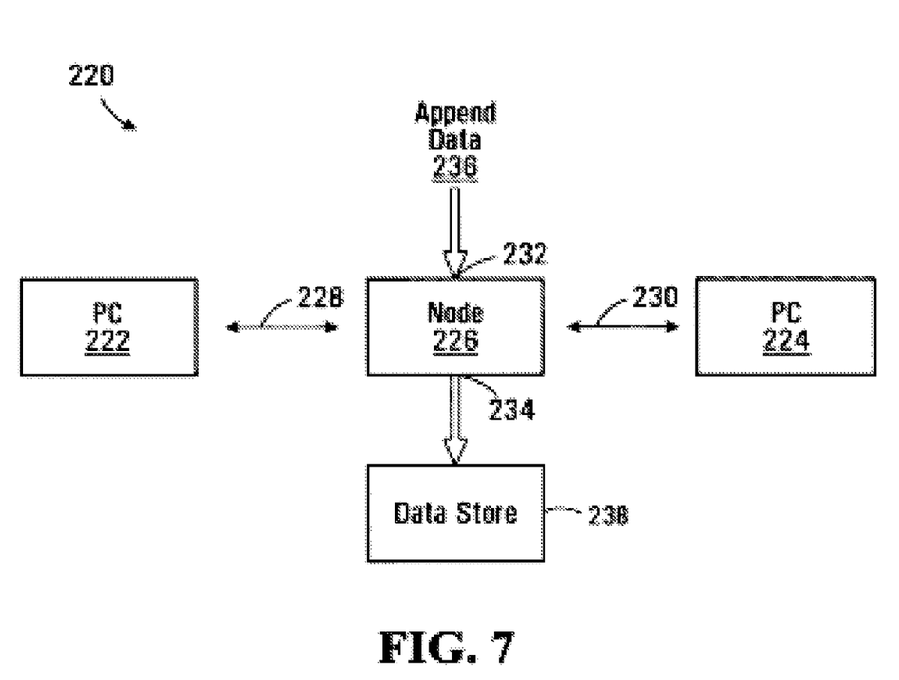
FIG. 7 is a schematic diagram of one embodiment of a further processing module used in the gateway shown in FIG. 2.

Referring to FIG. 7, one embodiment of the further processing module is shown at 220. The further processing module 220 includes a proxy node 226 which is in communication with a data store 238. The proxy node 226 performs a logical splitting of a communication session between a first PC 222 and a second PC 224, thus forming a first logical communication session indicated by the arrow 228 and a second logical communication session indicated by the arrow 230. The proxy node 226 performs a mapping of IP source and destination addresses, TCP source and destination ports, and data contained in TCP data packet data portions, such that PC's 222 and 224 are unaware of the logical splitting of the communication session by the proxy node 226. The proxy node 226 includes a data input 232 for receiving append data 236 which is inserted into data packets being transferred through the node 226 causing a message to be displayed at the PC 222 and/or PC 224 indicating that the users are not permitted to transfer such data. The proxy node 226 also includes a data output 234 which is coupled to the data store 238 for forwarding copies of the data packets, or a portion thereof, to a data store 238. The data store 238 may be a simple storage medium for storing data in an accessible format but may also include facilities for performing statistical or other analysis on the data transfers, for example.

Advantageously, the data associated with a communication session is initially transferred from the network interface 40 to the session identifier 46, the session controller 60, through the network interface 70 and out onto the WAN 12. In this embodiment, the session controller 60 does not wait for the signature analyzer 54 to complete the signature analysis and produce the control signal. Thus the data transfer is initially allowed to proceed without undue delay on the fast data transfer path 69 between the data output 68 of the session controller 60 and the data input 74 of the network interface 70. The processes implemented in the session identifier 46 and the session controller 60 may be simple and fast, requiring reading and comparison of a small number of fields from the headers of the data packets to identify and determine how to handle data associated with a communication session.

In contrast, depending on the policy in place in the gateway 16 the signature database 124 may include a large number of signatures. Consequently, in this embodiment the process implements a network management policy that initially assumes that communication sessions are safe, as would be the case in a large proportion of data transfers, and then determines whether the communication session should be subjected to further processing or dropped.

The communication session has been described in relation to a TCP/IP communication session. However, other protocols such as User Datagram Protocol (UDP) may also support communication sessions through a higher level protocol that uses UDP for data transfer. Examples of some higher level protocols that support communication sessions include Domain Name Server (DNS), eDonkey, BitTorrent, and Real-Time Transport Protocol (RTP). For example DNS responses and requests include an ID field for indicating which response matches which request.

While the process is described in relation to an outbound data transfer as depicted in FIG. 2, it should be understood that a communication session will generally include both outbound and inbound data transfers and that both inbound and outbound data may be received by the session identifier 46 and processed as described above.

While specific embodiments of the invention have been described and illustrated, such embodiments should be considered illustrative of the invention only and not as limiting the invention as construed in accordance with the accompanying claims.

What is claimed is:

1. An apparatus for managing a transfer of data in a data network, the apparatus comprising:
   a session identifier operably configured to identify data associated with a communication session between a first node and a second node in the data network, the identifying of data associated with the communication session including:
      performing signature analysis on an initial portion of the data associated with the communication session to identify further processing to apply to data of the communication session, the further processing identifying at least one data processing action to be performed with regard to data of the communication session;
      storing an identifier of the communication session in association with an identifier of the identified further processing;
      processing subsequently received data of the communication session according to the identified further processing; and
      prior to and until identifying the further processing, permitting data associated with the communication session to pass between the first node and the second node;
   a session controller having an input for receiving a control signal indicating whether said communication session meets a criterion, said session controller responsive to said control signal to produce a signal to indicate whether or not said communication session should be permitted to continue or should be subjected to further processing, the session controller permitting said communication session to continue without further processing when the control signal indicates the communication session does not meet the criterion; and a further processing module operably configured to perform said further processing as identified through performance of the signature analysis on the initial portion of data associated with the communication session and subsequently received data of the communication session, said further processing module including:
   a third node operably configured to divide said communication session into a first communication session between the first node and said third node and a second communication session between said third node and said second node, said third node acting as a proxy node; and
   altering data of the communication session prior to transmitting the data to at least one of the first and second nodes within the first and second communication sessions, respectively.

2. A method of managing a transfer of data in a data network, the method comprising:
   identifying data associated with a communication session between a first node and a second node in the data network, the identifying of data associated with the communication session including:
      performing signature analysis on an initial portion of the data associated with the communication session to identify further processing to apply to data of the communication session, the further processing identifying at least one data processing action to be performed with regard to data of the communication session;
      storing an identifier of the communication session in association with an identifier of the identified further processing;
      processing subsequently received data of the communication session according to the identified further processing; and
      prior to and until identifying the further processing, permitting data associated with the communication session to pass between the first node and the second node;
   performing the further processing data of said communication session when a portion of said communication session meets a criterion as identified through performance of the signature analysis on the initial portion of data associated with the communication session and subsequently received data of the communication session, said further processing comprises:
      terminating said communication session at a third node;
      dividing said communication session into a first communication session between the first node and said third node and a second communication session between said third node and the second node, said third node acting as a proxy node; and
      altering data of said communication session prior to transmitting the data to at least one of the first and second nodes within the first and second communication sessions, respectively; and
   permitting said communication session to continue when said portion of said communication session does not meet said criterion.

3. The method of claim 2, wherein said permitting said communication session to continue comprises permitting said communication session to continue on a first data transfer path and wherein said further processing said communication session comprises diverting said communication session to a second data transfer path, said second data transfer path being slower than said first data transfer path.

4. The method of claim 2, wherein said permitting said communication session to continue when said portion of said communication session does not meet said criterion comprises permitting a first portion of said communication session to continue while determining whether another portion of said communication session meets said criterion.

5. The method of claim 4, wherein the transfer of data comprises a plurality of data packets and wherein said permitting a first portion of said communication session to continue comprises permitting a first plurality of data packets associated with said communication session to be transferred while determining whether at least one subsequent data packet associated with said communication session meets said criterion.

6. The method of claim 2, wherein said communication session is a first communication session and wherein the third node splits the first communication session into the first and the second communication session including originating the second communication session.

7. The method of claim 2, further comprising associating a label with said data associated with said communication session in accordance with whether said portion of said communication session meets said criterion or does not meet said criterion.

8. A non-transitory device-readable medium, with instructions stored thereon, which when executed by at least one processor, causes a device to perform a method comprising:
   identifying data associated with a communication session between a first node and a second node in the data network, the identifying of data associated with the communication session including:
      performing signature analysis on an initial portion of the data associated with the communication session to identify further processing to apply to data of the communication session, the further processing identifying at least one data processing action to be performed with regard to data of the communication session;
      storing an identifier of the communication session in association with an identifier of the identified further processing;
      processing subsequently received data of the communication session according to the identified further processing; and
      prior to and until identifying the further processing, permitting data associated with the communication session to pass between the first node and the second node;
   performing the further processing data of said communication session when a portion of said communication session meets a criterion as identified through performance of the signature analysis on the initial portion of data associated with the communication session and subsequently received data of the communication session, said further processing comprises:
      terminating said communication session at a third node;
      dividing said communication session into a first communication session between the first node and said third node and a second communication session between said third node and the second node, said third node acting as a proxy node; and
      altering data of said communication session prior to transmitting the data to at least one of the first and second nodes within the first and second communication sessions, respectively; and permitting said communication session to continue when said portion of said communication session does not meet said criterion.

9. The non-transitory device-readable medium of claim 8, wherein said permitting said communication session to continue comprises permitting said communication session to continue on a first data transfer path and wherein said further processing said communication session comprises diverting said communication session to a second data transfer path, said second data transfer path being slower than said first data transfer path.

10. The non-transitory device-readable medium of claim 8, wherein said permitting said communication session to continue when said portion of said communication session does not meet said criterion comprises permitting a first portion of said communication session to continue while determining whether another portion of said communication session meets said criterion.

11. The non-transitory device-readable medium of claim 10, wherein the transfer of data comprises a plurality of data packets and wherein said permitting a first portion of said communication session to continue comprises permitting a first plurality of data packets associated with said communication session to be transferred while determining whether at least one subsequent data packet associated with said communication session meets said criterion.

12. The non-transitory device-readable medium of claim 8, wherein said communication session is a first communication session and wherein the third node splits the first communication session into the first and the second communication session including originating the second communication session and further comprising further processing said second communication session regardless of whether said second communication session meets said criterion.

13. The non-transitory device-readable medium of claim 8, further comprising associating a label with said data associated with said communication session in accordance with whether said portion of said communication session meets said criterion or does not meet said criterion.

* * * * *